United States Patent [19]

Edwards et al.

[11] Patent Number: 4,612,960

[45] Date of Patent: Sep. 23, 1986

[54] VALVE ASSEMBLY

[75] Inventors: Floyd V. Edwards, Cedarville; Dennis A. Boehmer, Xenia, both of Ohio

[73] Assignee: Vernay Laboratories, Inc., Yellow Springs, Ohio

[21] Appl. No.: 744,710

[22] Filed: Jun. 14, 1985

Related U.S. Application Data

[63] Continuation-in-part of Ser. No. 703,850, Feb. 21, 1985, Pat. No. 4,566,493.

[51] Int. Cl.$^4$ .............................................. F16K 15/14
[52] U.S. Cl. ..................................... 137/846; 137/850
[58] Field of Search ............... 137/846, 847, 848, 849, 137/850

[56] References Cited

U.S. PATENT DOCUMENTS

| | | | |
|---|---|---|---|
| 3,118,468 | 1/1964 | Bochan | 137/846 |
| 3,422,844 | 1/1969 | Grise | 137/846 X |
| 3,710,942 | 1/1973 | Rosenberg | 137/846 X |
| 4,535,818 | 8/1985 | Duncan | 137/846 |

Primary Examiner—Robert G. Nilson
Attorney, Agent, or Firm—Biebel, French & Nauman

[57] ABSTRACT

A valve assembly is disclosed for permitting relatively free flow in a first direction and for preventing flow in the path in a second, opposite direction. The assembly includes a resilient flow regulator including a pair of lips arranged to define a normally closed slit at the outer ends of the lips. An annular flange extends outwardly about the opposite end of the regulator. A housing outlet portion defines a housing interior having an outlet port and an open sealing end, with an annular collar disposed outwardly about the sealing end. The regulator is disposed within the housing outlet portion with the flange contained within the collar. A cover plate is attached to the collar for securing the regulator and for sealing the housing. The housing outlet portion defines a first sealing ring and the cover plate defines a second sealing ring such that the first and second sealing rings are disposed on opposite sides of the flange. At least one of the sealing rings includes a bevel, defined so that the flange is compressed between the sealing rings to a greater degree along the portion of the flange adjacent the lip bases than the portion of the flange adjacent the collar. The beveled surfaces thereby center and align the regulator within the housing and prevent distortion in the flange region of the regulator from being transmitted to the outer ends of the lips.

16 Claims, 12 Drawing Figures

VALVE ASSEMBLY

RELATED APPLICATION

This is a continuation-in-part of U.S. patent application Ser. No. 703,850, filed Feb. 21, 1985 now U.S. Pat. No. 4,566,493.

BACKGROUND OF THE INVENTION

The present invention relates generally to flow regulation apparatus, and more particularly, to a valve assembly adapted to permit substantially free flow through the valve in a first direction, while preventing flow through the valve in a second, opposite direction. Even more particularly, the present invention relates to valves commonly known as the "duckbill" type.

Duckbill valves have been known for some time and have been used in a variety of applications, several examples being shown in U.S. Pat. Nos. 3,822,720 and 3,901,272. Such a valve typically includes a housing into which is mounted a resilient flow regulator member having as its primary operative components a pair of lips arranged in a converging relationship from an open end at the base of the lips to a normally closed outer end. At the closed end of the regulator, the lips are located adjacent each other so as to define a normally closed slit therebetween. The regulator is mounted within the housing in a sealed relationship so that flow through the housing must pass through the regulator as well. In a first or forward direction, flow enters the housing and passes into the regulator through the open end, moving toward the normally closed end. The flow pressure against the resilient lips opens the slit, allowing the flow to pass out of the regulator and the housing. When flow enters the housing from a second or a reverse direction, however, flow contacts the regulator at its normally closed end, with the flow pressure against the resilient lips holding the slit in its closed position, thereby preventing flow through the valve assembly.

Frequently, valves of this type are used in medical environments, and one application for the valve is as part of a medical solution administration set. Such a set is used to deliver fluids such as plasma, medicines and the like from a fluid supply source, such as a bottle or bag, intravenously to a patient. The valve assembly is disposed within a fluid conduit to prevent flow in a backward direction toward the source, and is typically included in an administration set having a Y-site located downstream from the valve into which medicine or other fluids are injected at a pressure higher than the primary fluid flow.

One problem encountered with use of duckbill valves of conventional design in an administration set arises from the fact that whenever fluid flow is commenced through the valve, air bubbles typically collect around the valve assembly. Once fluid flow is established, these bubbles must be carried away with the fluid flow, so that they will not obstruct or interfere with the smooth and metered flow of fluid through the administration set.

Figure 1:
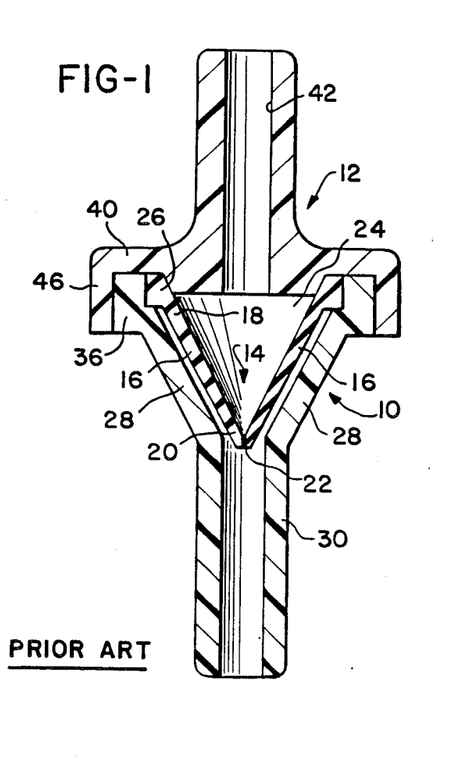
FIG. 1 is a sectional view of a prior art duckbill valve assembly of the type to which the present invention may be applied.

A solution to this problem is described in commonly-assigned, U.S. Pat. No. 4,535,818 issued Aug. 20, 1985 in which a duckbill valve assembly similar to that shown in FIG. 1 is disclosed. Referring to this drawing, the assembly housing includes an outlet portion 10 and a cooperating inlet portion 12. Portions 10 and 12 are preferably molded from a transparent acrylic plastic material, although many other materials could be used, depending upon the particular application for the valve assembly.

A flow regulator member 14, molded as a single piece from a material such as rubber or resilient plastic, is formed in a roughly conical, hollow shape. A pair of lips 16 form a portion of regulator 14, each lip 16 having a base region 18 and an outer end 20. Lips 16 are disposed in a converging relationship so that lips 16 are adjacent each other at their outer ends 20. Lips 16 thus form a normally closed slit 22 to define a normally closed end for regulator 14.

Curved side walls 24 interconnect lips 16 and define an open end for regulator 14 opposite slit 22. An outwardly extending flange 26 is formed around the open end of regulator 16 adjacent the bases 18 of lips 16.

Outlet portion 10 of the housing defines a housing interior that approximates the shape of regulator 14. A pair of planar walls 28 forming part of outlet portion 10 define a pair of planar surfaces for the housing interior Planar walls 28 are arranged in a converging relationship toward an outlet end of portion 10, where an outlet port 30 communicates with the housing interior.

Planar walls 28 are interconnected by curved walls, and an annular collar 36 extends around the open end of outlet portion 10. As a result, an annular shelf is defined, so that regulator 14 may be positioned within the housing interior by placement of flange 26 against collar 36. When so placed, lips 16 are disposed substantially adjacent to, but not in contact with, planar walls 28 of outlet portion 10. Outer ends 20 of lips 16 are then located at the outlet end of portion 10, so that fluid flow passing through slit 22 is directed into outlet port 30.

The housing inlet portion 12 includes a circular cover plate 40 through which an inlet port 42 communicates. A sealing ring 46 extends perpendicularly around the periphery to cover plate 40. (It should be noted that, although the valve assembly is shown as substantially circular in cross-section, see e.g., cover plate 40, other configurations are also usable, such as oval, rectangular or square.)

After regulator 14 is placed within outlet portion 10, inlet portion 12 is positioned thereon so that sealing ring 46 surrounds annular collar 36. Inlet and outlet portions 10 and 12 are fastened together along the portions of sealing ring 46 and cover plate 40 that are in contact with annular collar 36, to provide a sealed housing for regulator 14.

Housing portions 10 and 12 may be fastened by a variety of methods. For example, a glue or adhesive may be applied along annular collar 36. However, since the valve assemblies are manufactured in large quantities, it has been found to be preferable to seal the housing portions 10 and 12 by ultrasonic welding, a process in which the parts to be joined are stimulated by ultrasonic vibrations to achieve sufficient atomic movement to cause coalescence.

As can be seen from FIG. 1, relatively little spacing is provided between lips 16 of regulator 14 and planar surfaces 28 of outlet portion 10 to discourage air bubble formation and to facilitate bubble clearance during fluid flow and initiation through the valve. This spacing between the housing interior and regulator may be as little as 0.001" (0.0025 cm). Consequently, it is necessary that the regulator be positioned within the housing with great accuracy, since only a relatively little misalignment of regulator 14 will cause the regulator to contact the interior surfaces of outlet portion 10. Due to the soft, resilient nature of regulator 14, any such contact will cause distortion of the regulator 14 with the result that slit 22 at the outer ends of lips 16 can be prevented from fully closing or being closed. This in turn prevents the valve assembly from completely preventing flow through the assembly in reverse direction.

As a practical matter, it is difficult to properly orient the regulator within the housing portion due to the close fit between regulator 14 and the housing interior. Misalignment that can bring the lips 16 of regulator 14 into contact with planar surfaces 28 of the housing interior, thereby causing slit 22 to be partially opened, can arise from a number of causes. For example, such misalignment of the regulator can be rotational. However, misalignment can also be caused by regulator 14 being placed into housing portion 10 at a slightly off-center position, or at a slight angle with respect to the horizontal (with respect to FIG. 1).

Moreover, it has been found that the misalignment need not even be so severe as to bring the lips of the regulator into contact with the housing interior. Slight misalginments will cause distortions in the flange of the regulator when it is secured into place between the housing portions. Due to the very soft material from which the regulator is constructed, these distortions can be transmitted from the flange to the lips, where the distortions can prevent the lips from fully closing.

In any of the cases above, even though all the parts used in the valve assembly are fault free, the valve assembly as manufactured may fail to prevent flow in a reverse direction, thereby exhibiting leakage.

What is needed, therefore, is a modification to the assembly structure of a duckbill valve that will prevent unwanted misalignment of the regulator within the valve housing during assembling of the housing. Specifically, modifications are needed that will prevent misalignment caused by the valve regulator being positioned within the housing off-center or at an angle with respect to horizontal. Such modifications should not affect the ability of the valve assembly to prevent air bubble formation and facilitate bubble removal during flow initiation, nor should they interefere with valve assembly manufacturing procedures so as to complicate or make more expensive production of such assemblies.

SUMMARY OF THE INVENTION

The present invention may be incorporated within a valve assembly for use within a flow path for permitting relatively free flow along the path in a first direction and for preventing flow in the path in a second, opposite direction. A flow regulator is constructed as a single piece from a resilient material, and includes a pair of lips, each of the lips having a lip base and an outer end. The lips are arranged in a converging relationship to define for the regulator an open end adjacent the lip bases, and a normally closed end at the lip outer ends, whereat the lips are disposed adjacent each other to define a normally closed slit therebetween. The regulator further includes one side wall interconnecting the lips, and an annular flange extending outwardly at the open end.

A housing outlet portion defines a housing interior that includes an open sealing end surrounded by an annular collar disposed outwardly. An outlet port communicates with the housing interior through an outlet end opposite the open end.

A housing inlet portion includes a cover plate and an inlet port communicating therethrough.

The regulator is disposed within the housing outlet portion with its annular flange contained within the annular collar and with the lip outer ends extending toward the outlet end of the housing interior. The lips are directed toward the outlet end of the housing interior. The cover plate is attached to the annular flange for securing the regulator and for sealing the housing interior.

When the valve assembly is put together, the housing outlet portion defines a first sealing ring along the housing interior adjacent to the collar. The cover plate defines a second sealing ring adjacent the flange of the regulator, the first and second sealing rings being disposed on opposite sides of the flange. The valve assembly may be formed wherein at least one of the first and second sealing rings is provided with a bevel, the bevel being defined so that the flange is compressed between the first and second sealing rings to a greater degree along the portion of the flange adjacent the lip bases of the regulator than along the portion of the flange adjacent the collar.

Alternatively, the flange may be formed having a bevel on one or both of the flange surfaces adjacent the sealing rings, the bevel being defined such that the flange is thicker adjacent the collar than adjacent the lip bases. As a further alternative, a bevel may be formed on at least one of the sealing rings and on at least one surface of the flange.

Accordingly, it is a primary objective of the present invention to provide a duckbill valve assembly in which the valve regulator is properly positioned within the valve housing during the assembly process so as to result in a minimal number of completed assemblies which exhibit leakage. It is a further object of the present invention to provide a duckbill valve assembly in which distortions introduced into the regulator as it is secured within the housing are not transmitted to the regulator lips. It is a still further objective of the present invention to provide such an assembly that specifically reduces the possibility of misalignment of the regulator wherein the regulator is positioned off-center or out of the horizontal plane with respect to the housing interior. Additional objects of the invention are to provide such a valve assembly in which valving performance or air bubble prevention and clearance characteristics are not adversely affected, in which additional steps in the production of a valve assembly are not required, and in which the complexity of the components of the valve assembly or their cost of production are not significantly increased.

Other objects and advantages of the present invention will be apparent from the following description, the accompanying drawings and the appended claims.

DETAILED DESCRIPTION OF THE PREFERRED EMBODIMENT

The valve assembly of the present invention can be seen by reference to FIGS. 2–11. In general, the valve assembly is similar in construction and operation to the valve assembly shown in FIG. 1. However, the valve assembly of FIGS. 2–11 incorporates a number of significant improvements.

Figures 2, 3, 4A, 4B:
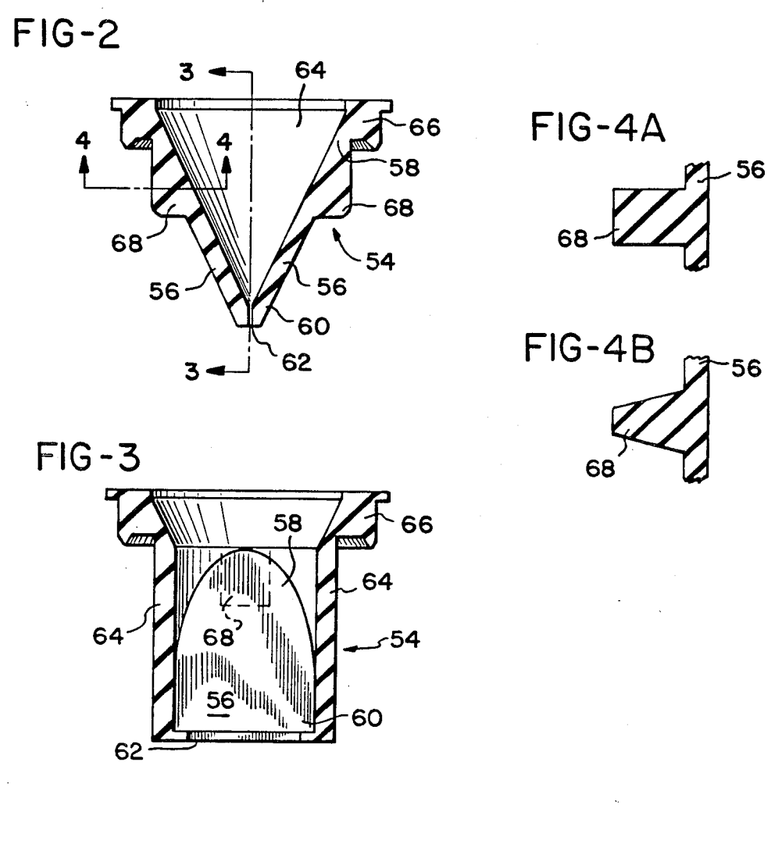
FIG. 2 is a sectional view of a regulator member of a valve assembly in accordance with one embodiment of the present invention.
FIG. 3 is a sectional view taken generally along line 3—3 of FIG. 2.
FIG. 4A is an immediate sectional view of a portion of the regulator member taken generally along line 4—4 of FIG. 2.
FIG. 4B is an immediate sectional view of an alternative embodiment for the regulator member, also taken generally along line 4—4 of FIG. 2.
Figure 5:
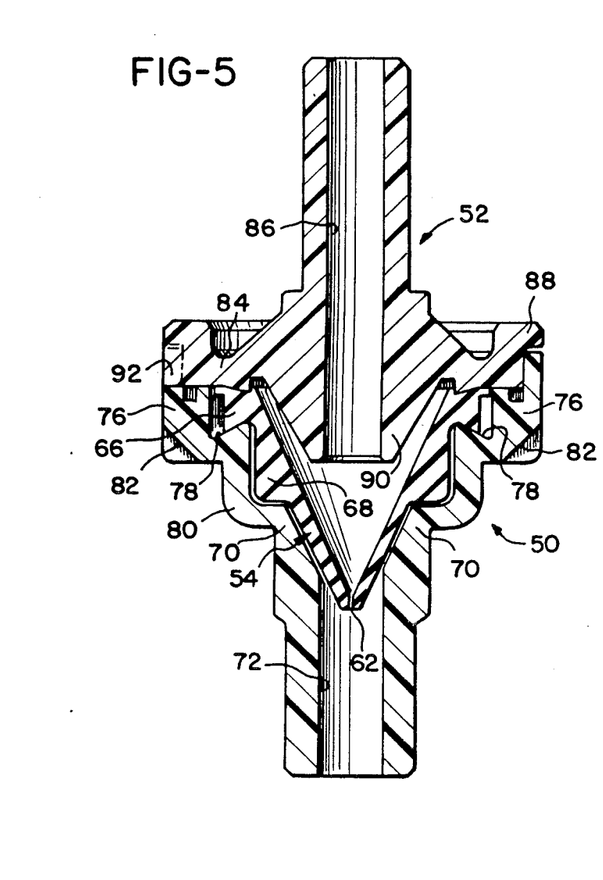
FIG. 5 is a sectional view similar to FIG. 1, but showing the valve assembly in accordance with the present invention.

Referring now in particular to FIG. 5, the valve assembly includes an outlet housing portion 50 and an inlet housing portion 52, within which is secured a flow regulator 54. Referring to FIG. 2, regulator 54 includes a pair of lips 56, each lip 56 having a base region 58 and an outer end 60. Lips 56 are disposed in a converging relationship so that they are adjacent each other at their outer ends. Lips 56 thus form a normally closed slit 62 at the normally closed end of regulator 54.

Curved side walls 64 interconnect lips 56 and define an open end for regulator 54 opposite slit 62. An outwardly extending flange 66 is formed around the open end of regulator 54 adjacent the bases 58 of lips 56.

Regulator 54 further includes a tab 68 formed on each of the lips 56 extending outwardly from the lip surface near the lip base 58. As shown in FIGS. 4A and 4B, tabs 68 may be either rectangular or trapezoidal in cross section, or can alterantively be of some other shape.

Returning now to FIG. 5, outlet portion 50 of the housing includes a pair of planar walls 70 that define a pair of planar surfaces for the housing interior. Walls 70 are arranged in a converging relationship toward an outlet end of portion 50, where an outlet port 72 communicates with the housing interior.

Planar walls 70 are interconnected by a curved wall 74 (see FIG. 7), and an annular collar 76 extends around the open end of outlet portion 50. As a result, an annular supporting surface 78 is defined, so that regulator 54 may be positioned within the housing interior by placement of flange 66 of the regulator against supporting surface 78 within collar 76. When so placed, lips 56 are disposed substantially adjacent to but not in contact with planar walls 70 of outlet portion 50.

Each planar wall 70 is provided with a recess 80 into which a tab 68 on a lip 56 of regulator 54 is fitted as the regulator is inserted into the housing portion. Thus, tabs 68 and recesses 80 cooperate to radially align regulator 54 into the proper rotational position within outlet portion 50. Additionally, tabs 68 and recesses 80 serve to secure regulator 54 rotationally once positioned, so that any "dancing" (i.e., vibration) of the regulator caused during the ultrasonic welding process will not move regulator 54 out of position. Similarly, any inadvertent twisting of the housing portions 50 and 52 will not adversely affect regulator 54. However, since tabs 68 are formed on lips 56 near their bases 58, the tabs have no detrimental effect upon the performance of the completed valve assembly. In fact, it is suspected that tabs 68 may even improve valve performance, by stiffening lips 56 along the portions thereof away from slit 62.

Of course, for tabs 68 to engage recesses 80, regulator 54 must be in its proper rotational position with respect to housing portion 50 as the regulator is placed into the housing portion. This is particularly so due to the resilient nature of regulator 54, so that tabs 68 cannot provide any large degree of aligning force. Thus, housing portion 50 must be aligned prior to receiving regulator 54.

Figure 7:
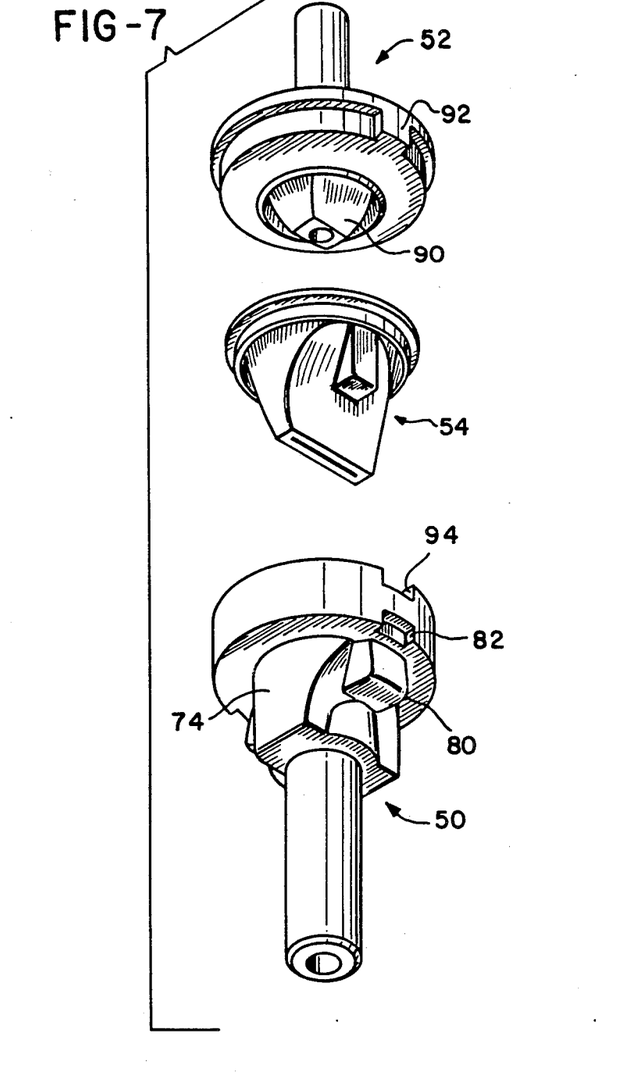
FIG. 7 is an exploded isometric view showing the entire valve assembly.
Figure 8:
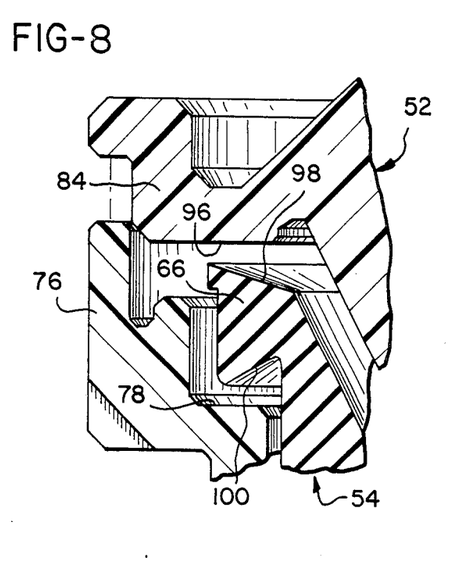
FIG. 8 is a view similar to a portion of FIG. 6, showing an exploded view of an alternate embodiment of the valve assembly.

As seen in FIGS. 5 and 7, collar 76 of housing portion 50 is provided with a pair of notches 82 that are formed into collar 76. These notches 82 then serve as points of engagement with cooperating holding apparatus during the assembly operation, to insure that housing portion 50 is properly aligned to receive regulator 68.

It will be noted that notches 82 and recesses 80 are formed within the same vertical plane. This is so that during the machining of the molds within which housing portions 50 are formed, table movements of the cutting tools and the like are held to a minimum. Thus, sources of alignment error caused during mold construction are reduced. Moreover, maintaining notches 82 and recesses 80 within the same vertical plane helps to reduce sources of alignment error during assembly.

Inlet housing portion 52 includes a cover plate 84 through which an inlet port 86 opens. Once regulator 54 has been placed within outlet portion 50, cover plate 84 is placed against collar 76 to secure regulator 54 in place. An annular ring 88 is attached at the periphery of cover plate 84, to increase the bonding surface between housing portions 50 and 52.

A projection 90 is centered on the inner side of cover plate 84 with inlet port 86 opening therethrough. As can best be seen in FIG. 7, projection 90 is shaped to approximate the interior configuration of regulator 54, and extends into regulator 54 to approximately one-third to one-half of the distance to slit 62. Projection 90 serves as a means of reducing interior volume space to facilitate faster air purging of the valve assembly.

In addition, inlet portion 52 includes at least one key 92 that cooperates with a notch 94 formed into collar 76. Key 92 and notch 94 provide for proper rotational alignment of housing portion 52 when place on portion 50, to insure that projection 90 fits properly within regulator 54. In addition, key 92 and notch 94 prevent any radial twisting between housing portions 50 and 52 which could dislodge regulator 54. It will be noted that key 92 and notch 94 are located within the same vertical plane as notch 82 and recess 80, for the reasons which have been stated above. Further, as an alternative embodiment, key 92 and notch 94 may be reversed; i.e., key 92 may be formed on collar 76 while notch 94 is formed into inlet portion 52.

Figure 6:
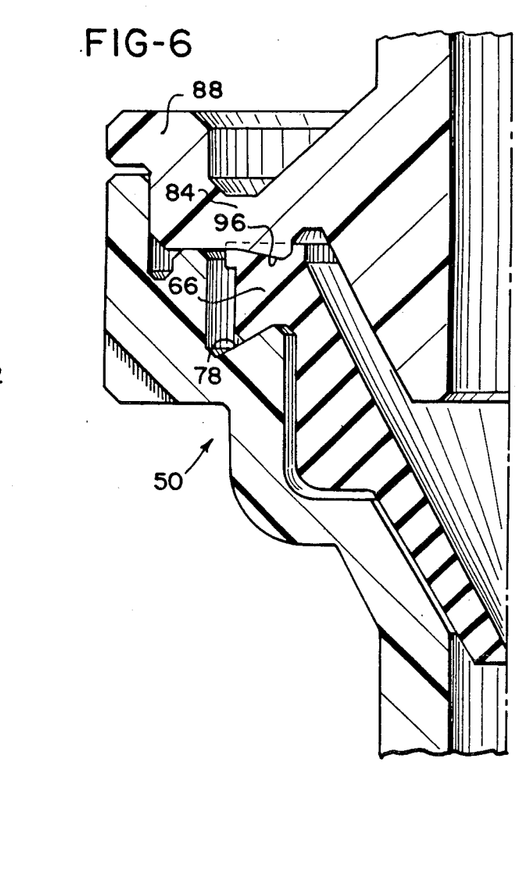
FIG. 6 is an enlarged view of a portion of FIG. 5.

As yet a further improvement, it will be noted from FIG. 6 that supporting surface 78 within housing portion 50 is formed along a bevel sloping downwardly with respect to the center axis of housing portion 50.

Similarly, a beveled surface 96 extends as a ring along cover plate 84 on the surface thereof which is contact with flange 66 of regulator 54. These beveled surfaces 78 and 96 can be regarded as defining sealing rings for regulator 54.

By comparing flange 66 as shown in FIGS. 2 and 3 with the manner in which flange 66 fits between surfaces 78 and 96 shown in FIG. 6, it can be seen that greater compression is placed upon flange 66 along that portion adjacent the bases 58 of lips 56 than along that portion which is adjacent collar 76. It should be recognized that this compression produces a force component in an outward direction around the entire circumference of flange 66. This uniform outward stretching of flange 66 serves to center regulator 54, and particularly slit 62, within housing portion 50. Thus, any inadvertent misalignment of regulator 54 within housing portion 50, particularly angular misalignment from a horizontal plane, will tend to be overcome.

It has also been found that placing greater compression upon flange 66 along the portion adjacent lips 56 inhibits the transmittal of distortions from flange 66 caused by misalignment within the housing to the outer ends of lips 56. This effect may be of greatest significance, as such distoritions may be quite difficult to detect or prevent.

Figure 11:
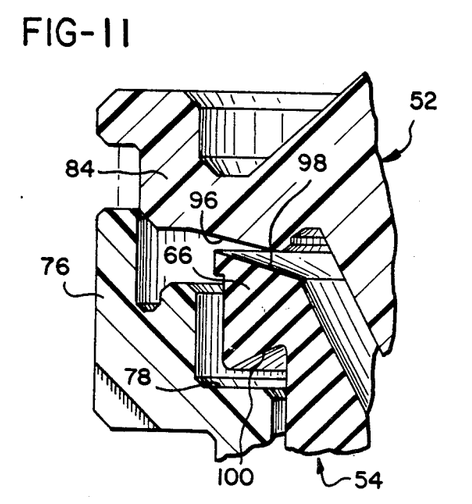
FIG. 11 is a view similar to a portion of FIG. 6 showing a further alternate embodiment of the valve assembly.

It should be recognized that the foregoing effects can be produced in a number of different ways. For example, a bevel may be provided on each of surfaces 78 and 96, as shown in FIG. 6. As an alternative, a bevel may be provided on only one of these surfaces. As a further alternative, surfaces 78 and 96 may be formed without any bevel, while one or both of upper and lower surfaces 98 and 100, respectively, of flange 66 are provided with a bevel. (See FIG. 8; see also lower surface 100 of flange 66 in FIG. 2.) As a still further alternative, bevels could be provided on both flange 66 and surfaces 78 and 96, as shown in FIG. 11.

Figure 9:
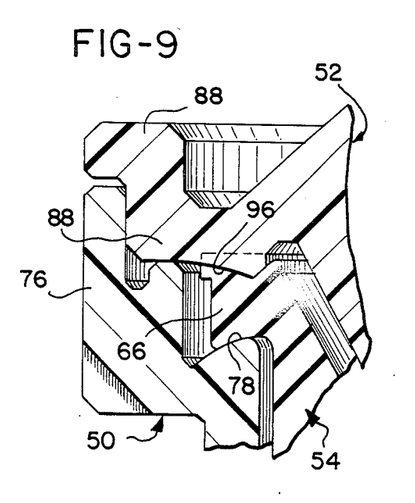
FIG. 9 is a view similar to a portion of FIG. 6, showing a further alternate embodiment of the valve assembly.
Figure 10:
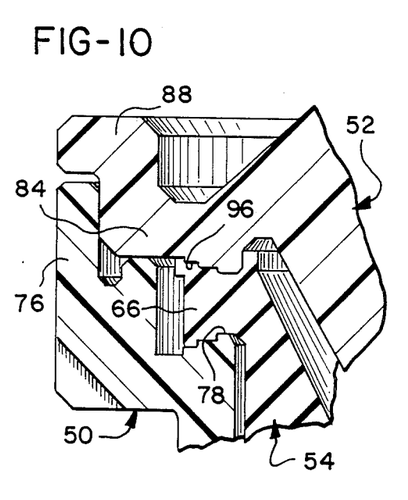
FIG. 10 is a view similar to a portion of FIG. 6, showing a still further alternate embodiment of the valve assembly.

It should also be recognized that beveled surfaces 78 and 96 need not be linear in cross section as shown in FIG. 6. What is important is that surfaces 78 and 96 place greater compression along the inner portion of flange 66 than along the outer. Thus, the cross section of surfaces 78 and 96 could in fact be curved, as shown in FIG. 9, stepped, as shown in FIG. 10, or any other of a number of variations. Similarly, where a bevel is provided on flange 66 rather than on surfaces 78 and/or 96, it may be formed with a linear, curved, stepped or other cross-section.

Finally, it should be noted that while the present invention is particularly adapted to valve assemblies in which the regulator fits closely within the housing, the invention would be useful in any duckbill valve assembly in which the regulator is secured within the housing by clamping of a peripheral flange. Accordingly, the present invention should not be construed as being limited to the specific housing structure set forth herein.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Valve assembly for use within a flow path for permitting relatively free flow in said flow path in a first direction and for preventing flow in said path in a second, opposite direction, comprising:

a flow regulator constructed as a single piece from a resilient material, said regulator including a pair of lips, each of said lips having a lip base and an outer end;

said lips being arranged in a converging relationship to define for said regulator an open end adjacent said lip bases, and a normally closed end at said lip outer ends whereat said lips are disposed adjacent each other to define a normally closed slit therebetween, said regulator further including at least one side wall interconnecting said lips and an annular flange having an axial height extending outwardly at said open end;

a housing outlet portion defining a housing interior having a closed outlet end and an open sealing end, said housing outlet portion further including an outlet port communicating with said outlet end and an annular collar disposed outwardly about said sealing end; and a housing inlet portion having a cover plate and an inlet port communicating therethrough;

said regulator being disposed within said housing outlet portion with said annular flange contained within said annular collar and said lip outer ends extending toward said outlet end of said housing interior;

said cover plate being attached to said annular collar for securing said regulator by contact with said flange and for sealing said housing interior;

said housing outlet portion defining a first sealing ring along said housing interior extending inwardly from said collar adjacent said flange, and said cover plate defining a second sealing ring adjacent said flange, said first and second sealing rings being disposed on opposite sides of and in contact with said flange; and at least one of said first and second sealing rings having a bevel, said bevel being defined and said height of said flange being selected so that said flange is compressed between said first and second sealing rings to a greater degree along the portion of said flange adjacent said lip bases than along the portion of said flnage adjacent said collar.

2. Valve assembly as defined in claim 1, wherein said bevel is linear in cross section.

3. Valve assembly as defined in claim 1, wherein said bevel is curved in cross section.

4. Valve assembly as defined in claim 1, wherein said bevel is stepped in cross section.

5. Valve assembly for use within a flow path for permitting relatively free flow in said flow path in a first direction and for preventing flow in said path in a second, opposite direction, comprising:

a flow regulator constructed as a single piece from a resilient material, said regulator including a pair of lips, each of said lips having a lip base and an outer end;

said lips being arranged in a converging relationship to define for said regulator an open end adjacent said lip bases, and a normally closed end at said lip outer ends whereat said lips are disposed adjacent each other to define a noramally closed slit therebetween, said regulator further including at least one side wall interconnecting said lips and an annular flange extending outwardly at said open end;

said flange having first and second opposite sides, a peripheral outer surface and an axial height;

a housing outlet portion defining a housing interior having a closed outlet end and an open sealing end, said housing outlet portion further including an outlet port communicating with said outlet end and an annular collar disposed outwardly about said sealing end; and a housing inlet portion having a cover plate and an inlet port communicating therethrough;

said regulator being disposed within said housing outlet portion with said annular flange contained within said annular collar and said lip outer ends extending toward said outlet end of said housing interior;

said cover plate being attached to said annular collar for securing said regulator by contact with said flange and for sealing said housing interior;

said housing outlet portion defining a first sealing ring along said housing interior extending inwardly from said collar adjacent said flange, and said cover plate defining a second sealing ring adjacent said flange, said first and second sealing rings being disposed adjacent and in contact with said first and second opposite sides of said flange; and at least one of said first and second opposite sides having a flange bevel, said flange bevel being defined so that said flange is formed having a greater thickness along the portion of said flange adjacent said peripheral outer surface than the portion of said flange adjacent said lip bases, and said height of said flange being selected so that said flange is compressed between said first and second sealing rings to a greater degree along the portion of said flange adjacent said lip bases than along the portion of said flange adjacent said collar.

6. Valve assembly as defined in claim 5, wherein said flange bevel is linear in cross section.

7. Valve assembly as defined in claim 5, wherein said flange bevel is curved in cross section.

8. Valve assembly as defined in claim 5, wherein said flange bevel is stepped in cross section.

9. Valve assembly as defined in claim 5, wherein at least one of said first and second sealing rings includes a ring bevel, said ring bevel being defined so that said flange is compressed between said first and second sealing rings to a greater degree along the portion of said flange adjacent said lip bases than the portion of said flange adjacent said collar.

10. Valve assembly as defined in claim 9, wherein said ring bevel is linear in cross section.

11. Valve assembly as defined in claim 9, wherein said ring bevel is curved in cross section.

12. Valve assembly as defined in claim 9, wherein said ring bevel is stepped in cross section.

13. Valve assembly for use within a flow path for permitting relatively free flow in said flow path in a first direction and for preventing flow in said path in a second, opposite direction, comprising:

a flow regulator constructed as a single piece from a resilient material, said regulator including a pair of lips, each of said lips having a lip base and an outer end;

said lips being arranged in a converging relationship to define for said regulator an open end adjacent said lip bases, and a normally closed end at said lip outer ends whereat said lips are disposed adjacent each other to define a normally closed slit therebetween, said regulator further including at least one side wall interconnecting said lips and an annular flange having an axial height and extending outwardly at said open end;

a housing outlet portion defining a housing interior approximating the shape of said regulator, said housing interior having a pair of planar surfaces corresponding to said pair of lips, each of said planar surfaces having a planar surface base, said surfaces being arranged in a converging relationship from said planar surface bases toward an outlet end, said housing outlet portion further including an outlet port communicating with said outlet end and an annular collar disposed outwardly adjacent said planar surface bases; and a housing inlet portion having a cover plate and an inlet port communicating therethrough;

said regulator being disposed within said housing outlet portion with said annular flange contained within said annular collar and said lip outer ends extending toward said outlet end of said housing interior, and with said lips being substantially adjacent to but not in contact with said planar surfaces;

said cover plate being attached to said annular collar for securing said regulator by contact with said flange and for sealing said housing interior;

said housing outlet portion defining a first sealing ring along said housing interior extending from said collar to said planar surface bases, and said cover plate defining a second sealing ring adjacent said flange, said first and second sealing rings being disposed on opposite sides of and in contact with said flange; and at least one of said first and second sealing rings having a bevel, said bevel being defined and said height of said flange being selected so that said flange is compressed between said first and second sealing rings to a greater degree along the portion of said flange adjacent said lip bases than along the portion of said flange adjacent said collar.

14. Valve assembly as defined in claim 13, wherein said bevel is linear in cross section.

15. Valve assembly as defined in claim 13, wherein said bevel is curved in cross section.

16. Valve assembly as defined in claim 13, wherein said bevel is stepped in cross section.

* * * * *